Aug. 28, 1934. S. LERMA Re. 19,292

FABRIC COVERED BUCKLE

Original Filed Feb. 25, 1932

INVENTOR.
STEPHEN LERMA
BY Joseph Blacker.
ATTORNEY

Reissued Aug. 28, 1934 Re. 19,292

UNITED STATES PATENT OFFICE 19,292

FABRIC COVERED BUCKLE

Stephen Lerma, Brooklyn, N. Y., assignor to Everybody's Tool & Die Works, Corp., a corporation of New York Original No. 1,859,098, dated May 17, 1932, Serial No. 595,048, February 25, 1932. Application for reissue January 18, 1934, Serial No. 707,153

8 Claims. (Cl. 24—163)

The present invention relates to improvements in buckles, and particularly to fabric covered sheet metal buckles for garment ornamentation.

An object of this invention is to provide a buckle made of two metallic plate members, each member being provided with two adjacent apertures and an integral crossbar member and with upturned right-angularly extending flanges at the peripheries of said apertures and at the outer periphery, said plate members being united into a unitary article by overlapping the said flanges and by turning back the edges of the flanges of the front plate member over the rear surface of the buckle, the cross-bar members being united to form a cross-bar.

Another object of this invention is to provide a sheet metal buckle having spaced front and rear faces and which is covered all over with fabric including the cross-bar, so that the metal is not visible and whereby the surfaces of the buckle blend with the garment material and ornament the garment; the ornamentation being especially effective when the buckle is covered with fabric of a color that blends with that of the material of the garment.

Another object of this invention is to provide a hollow sheet metal buckle having a hollow rectangular cross-bar having single walls spaced apart and positioned in the same planes as the front and rear faces of the buckle, and having double walls spaced apart and facing laterally of the front and rear faces, whereby the cross-bar is stiffened against strain and will withstand a considerable pressure without any bending or deformation.

Another object of this invention resides in the provision of an ornamental improvement of this nature which will be simple in construction, inexpensive to manufacture, strong and durable.

With the above and other objects in view the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which.

Figure 1:
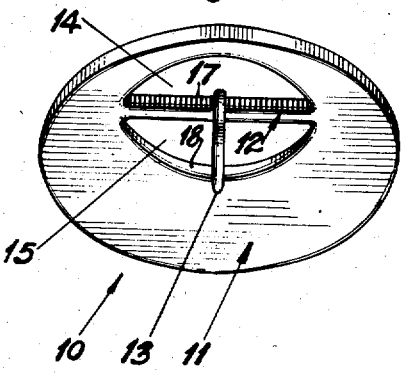
Figure 1 is a perspective view of an assembled buckle of circular form and having two adjacent apertures and a cross-bar positioned in eccentric relation.
Figure 4:
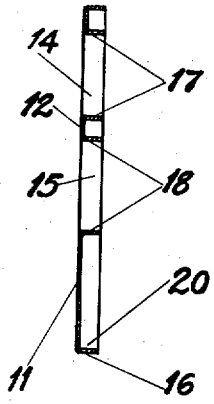
Figure 4 is a sectional view of the front plate member of the buckle, the section being taken as on line 4—4 in Figure 3.

In the illustrated embodiments of the invention, Figure 1 shows an assembled buckle 10, having a flat front plate member 11, an integral cross-bar member 12, and a tongue 13. As best shown in Figure 4, the front plate member 11 is provided with two adjacent apertures 14, 15, and an intermediate integral cross-bar member 12. A flange 16 extends all around the outer periphery and in right-angular relation with the flat outer face of the front plate member 11.

Figure 3:
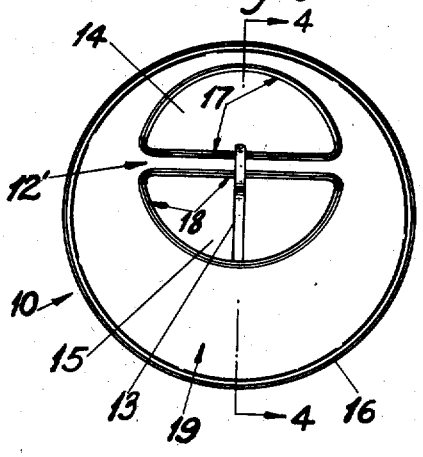
Figure 3 is a plan view of the buckle shown in Figure 1 and shows the rear face of the buckle, edges unturned.

As shown in Figure 3, there has been provided a flange 17, which circumscribes and extends in right-angular relation with the periphery of the aperture 14. A flange 18 has also been provided which circumscribes and extends in right-angular relation with the periphery of the aperture 15. It will be noted that the portions of the flanges 17 and 18 at the cross-bar member 12, form reenforcements which stiffen the cross-bar member 12 against strain due to bending.

Figure 5:
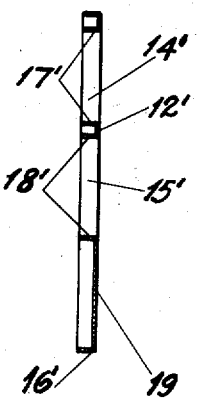
Figure 5 is a sectional view of the rear plate member of the buckle, the section being taken as on line 4—4 in Figure 3.

Referring to Figure 5, it will be seen that there has been provided a flange 16′ which extends all around the outer periphery and in right-angular relation with the flat outer face of the rear plate member 19, the flange 16′ being of slightly smaller circumference than the inner circumference 20 of the flange 16, on the front plate member 11. In assembled relation, for covering with fabric, the flanges are spaced apart uniformly throughout their entire surface areas. It will also be seen that the rear plate member 19 has been provided with two apertures 14′ and 15′ similar to but slightly larger than the apertures 14 and 15. It will be noted that the portions of the flanges 17′ and 18′ at the cross-bar member 12′ form reenforcements which stiffen the cross-bar member 12′ against strain due to bending, that the width of the rear portion of the cross-bar is less than the width of the front portion, and that when the buckle is assembled and the opposite flanges interengage, the assembled cross-bar members form a cross-bar which comprises four walls facing laterally. It will thus be seen that the lateral double wall flanges 17, 17′, and 18, 18′, on both sides of the cross-bar make it possible to engage opposite pieces of fabric and to cover the cross-bar with foldings of fabric on all sides.

Figure 6:
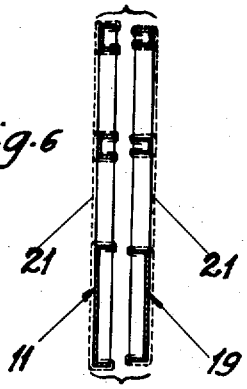
Figure 6 is a sectional view of the front and rear plates members with fabric covering in position.

Figure 6 shows the fabric coverings 21, 21, stretched around the outer surfaces of the front and rear or the outer and inner plate members as it appears when a covered buckle is taken apart after assembling in the die.

Figure 7:
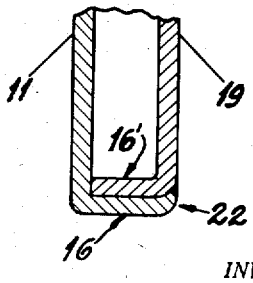
Figure 7 is an enlarged fragmentary portion of an assembled buckle.

Figure 7 shows an enlarged fragmentary portion of a buckle, with the front and rear plate members 11 and 19 in assembled relation. The flanges 16 and 16′ are in laterally overlapping relation. The far edge 22 of the flange 16 has been turned back over the rear plate member 19, thereby locking the front and rear plate members together.

Figure 2:
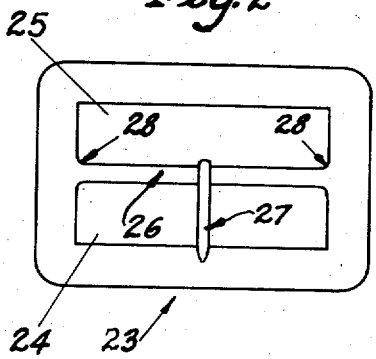
Figure 2 is a plan view of an assembled buckle of rectangular form and having two adjacent apertures and a cross-bar positioned in central relation.

As shown in Figure 2, the rectangular buckle 23 is provided with two adjacent apertures 24, 25, a cross-bar 26, and a tongue 27. Inasmuch as buckles used for the ornamentation of garments may be of large size and the cross-bar may have a length of two inches so as to be adapted for use with wide belts, the elongated cross-bar must be reenforced to withstand the strains brought to bear on it due to the tightening of the belt, and for this purpose the metal of the cross-bar at its junction with the front and rear plate members has been given a rounded and gradually widening shape 28, and forming a rigid brace or reenforcement for the cross-bar. The result is that any strain that is brought to bear on the cross-bar is transmitted by these reenforcements to the front and rear plate members of the buckle.

It is desirable that the tongue of the buckle should be centrally disposed on the body portion of the assembled buckle, and it is contemplated to make the width of the belt of the same width as the cross-bar and accordingly there has not been provided any offset bearing or seat on the cross-bar for centralizing the tongue.

It will thus be seen that there has been provided a buckle structure by means of which it is possible to completely cover a buckle with fabric, including the cross-bar.

Having thus described my invention, I claim as new and desire to secure by Letters Patent:

1. A buckle having a body formed of two dished plates of sheet metal secured together at their peripheries in substantially parallel spaced relation, each of said plates being provided with two apertures separated by an integral cross-bar member of hollow rectangular section, the combined cross-bar members forming a cross-bar having single walls spaced apart and positioned in the same planes as the front and rear faces of the buckle and having double walls spaced apart and facing laterally of the front and rear faces.

2. A buckle of the class described comprising in combination a front face member having two apertures and right-angularly extending flanges all around said apertures, and having a right-angularly extending flange all around the outer periphery, a rear face member having similar apertures and flanges registering with and circumscribed by said front face flanges, said apertures being spaced apart and forming a cross-bar with said front and rear face members, said cross-bar being of hollow rectangular section and having six layers of metal in the walls of said section, whereby said cross-bar is stiffened against strain.

3. A fabric covered buckle of the class described, comprising two spaced front and rear sheet metal plate members, each plate member having apertures and flanges all around said apertures and all around the outer periphery and having a cross-bar member intermediate said apertures, the flanges of said front and rear members engaging one another and being locked together by having the far edges of the flanges of one of said members turned back around the face of the other member and enclosing a folding of the fabric stretched over each face of the buckle and including a cross-bar formed by said cross-bar members, whereby the metallic surfaces of said buckle are not visible.

4. A fabric covered buckle of the class described, comprising two spaced front and rear sheet metal plate members, each plate member having apertures and right-angularly extending flanges all around said apertures and all around the outer periphery and having a cross-bar member intermediate said apertures, the flanges of said front and rear members engaging one another and being locked together by having the far edges of the flanges of one of said members turned back around the face of the other member and enclosing a folding of fabric stretched over at least one of the faces of the buckle and including a cross-bar formed by said cross-bar members.

5. A hollow buckle formed of two dished and apertured plates of sheet metal, each of said plates having a base and flanges extending substantially at right angles to said base and substantially around the outer periphery and apertures thereof, the flanges of one plate being designed to interengage with the flanges of the other plate, the flanges of said plates holding said plates in assembled and spaced and substantially parallel relation, said buckle having a cross-bar of hollow and reinforced cross-section.

6. A hollow buckle composed of two flanged and apertured plates disposed in nested relation to each other, each of said plates having a base and flanges extending at right-angles to said base, the flanges of each plate extending substantially around the outer periphery and substantially around the apertures thereof, the flanges of the said plates holding said plates in assembled and spaced relation, said buckle having a cross-bar which has lateral wall means forming a hollow cross-section.

7. In a hollow buckle, a pair of apertured plates having outer peripheral flanges and assembled with said flanges in nested relation to each other, said nested flanges being sufficiently spaced from each other to permit the insertion of fabric between said nested flanges, said assembled buckle having a pair of apertures separated and defined by cross-bar means, said cross-bar means being integral with at least one of said plates, said assembled buckle having a second pair of nested flanges, the outer flange of said second pair substantially forming the wall of said apertures, said cross-bar means having lateral extensions which provide a reinforcement for said cross-bar means.

8. In a hollow buckle designed to be covered with fabric or similar material, two apertured plates each having a base and flanges at right-angles thereto, fabric covering stretched over at least one of said bases and the flanges thereof, the flanges on one plate being disposed in nested relationship with and spaced from the corresponding flanges on the other plate so as to permit the fabric covering of the buckle to be inserted and clamped therebetween, said fabric covering being clamped by said flanges throughout substantially the entire area of said fabric which is located between said flanges, the flanges on said plates surrounding the outer peripheries and apertures thereof, said buckle having a cross-bar means integral with at least one of said plates, said cross-bar means having integral lateral extensions which constitute a reenforcement for said cross-bar means.

STEPHEN LERMA.

DISCLAIMER

Re. 19,292.—*Stephen Lerma*, Brooklyn, N. Y. FABRIC COVERED BUCKLE. Patent dated August 28, 1934. Disclaimer filed December 29, 1934, by the patentee, and the assignee, *Everybody's Tool and Die Works Corporation.*

Severally and jointly enter this disclaimer as follows:

(*a*) They disclaim from claim No. 1 a buckle in which the plates do not have flanges inclined to the bodies of said plates, at the peripheries of said plates and also at the edges of said apertures, said peripheral flanges clamping the fabric covering.

(*b*) They disclaim from claim No. 2 a buckle in which the flanges at the edges of the apertures and at the outer peripheries of said face members do not clamp fabric covering.

(*c*) They disclaim from claim No. 5 a buckle in which the peripheral flanges do not clamp fabric covering.

[*Official Gazette February 26, 1935.*]

relationship with and spaced from the corresponding flanges on the other plate so as to permit the fabric covering of the buckle to be inserted and clamped therebetween, said fabric covering being clamped by said flanges throughout substantially the entire area of said fabric which is located between said flanges, the flanges on said plates surrounding the outer peripheries and apertures thereof, said buckle having a cross-bar means integral with at least one of said plates, said cross-bar means having integral lateral extensions which constitute a reenforcement for said cross-bar means.

STEPHEN LERMA.

DISCLAIMER

Re. 19,292.—*Stephen Lerma*, Brooklyn, N. Y. FABRIC COVERED BUCKLE. Patent dated August 28, 1934. Disclaimer filed December 29, 1934, by the patentee, and the assignee, *Everybody's Tool and Die Works Corporation.*

Severally and jointly enter this disclaimer as follows:

(*a*) They disclaim from claim No. 1 a buckle in which the plates do not have flanges inclined to the bodies of said plates, at the peripheries of said plates and also at the edges of said apertures, said peripheral flanges clamping the fabric covering.

(*b*) They disclaim from claim No. 2 a buckle in which the flanges at the edges of the apertures and at the outer peripheries of said face members do not clamp fabric covering.

(*c*) They disclaim from claim No. 5 a buckle in which the peripheral flanges do not clamp fabric covering.

[*Official Gazette February 26, 1935.*]